H. BOYKOW.
APPARATUS FOR DETERMINING THE ANGLE OF PROJECTION FOR PROJECTILES FROM AERIAL VESSELS.
APPLICATION FILED SEPT. 27, 1913.
1,114,705.
Patented Oct. 20, 1914
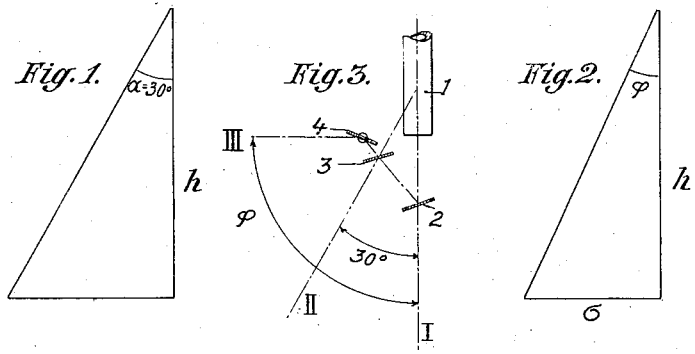
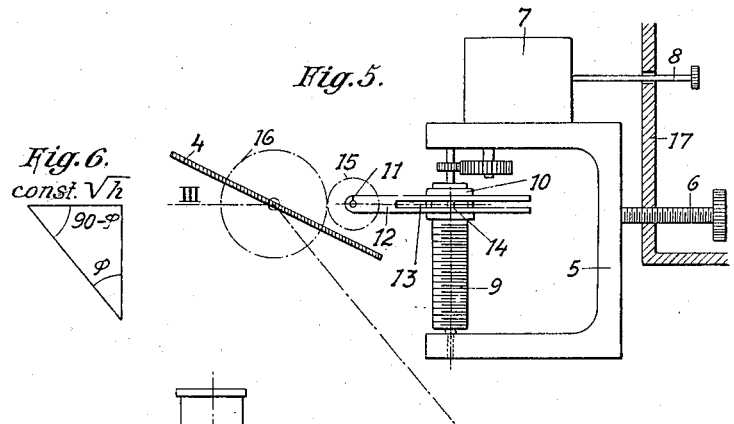
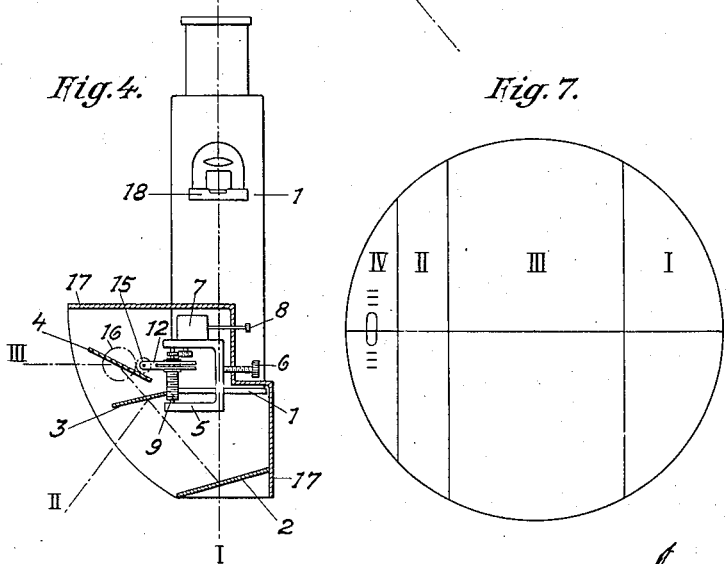

UNITED STATES PATENT OFFICE.

HANS BOYKOW, OF KIEL, GERMANY.

APPARATUS FOR DETERMINING THE ANGLE OF PROJECTION FOR PROJECTILES FROM AERIAL VESSELS.

1,114,705. Specification of Letters Patent. Patented Oct. 20, 1914.

Application filed September 27, 1913. Serial No. 792,197.

*To all whom it may concern:*

Be it known that I, HANS BOYKOW, K. K. Fregatten-Leutnant a. D., residing at 51 Esmarch street, Kiel, Germany, have invented certain new and useful Improvements in Apparatus for Determining the Angle of Projection for Projectiles from Aerial Vessels, of which the following is a specification.

This invention relates to apparatus for determining the angle of projection for projectiles discharged from an aerial vessel in order to strike a given target. The projectile at the instant at which it leaves the vessel has a horizontal velocity equal to that at which the vessel is traveling and its path is a parabola defined by this velocity, and by the velocity of its fall which bears a definite relationship to the height of the vessel above the target. The projectile must therefore be discharged when the target is at a certain angle to the line of projection or departure of the projectile determined by these two considerations, this angle being the angle of projection. As will be hereinafter demonstrated it is possible to discover this angle by the time occupied by the apparent movement of a fixed object on the earth's surface (when viewed from the aerial vessel) through any selected angle of vision when the second factor viz., the height of the aerial vessel is known. This height is read from the barometer. The time occupied by the apparent movement of a stationary object through a fixed angle was first of all determined by means of a stop watch and then by means of a table of curves the adjustment of the sighting apparatus to the required angle was effected. While the fixed object is traveling the definite angle of vision according to the present invention the adjustment of the angle is made automatically, so that immediately after this measurement the apparatus is ready for sighting the target.

In order that the said invention may be clearly understood and readily carried into effect, I will describe the same more fully with reference to the accompanying drawing in which:—

Figures 1 and 2 are diagrams explaining the theory of the improved apparatus. Fig. 3 is a diagrammatic representation of the essential parts of the improved apparatus. Fig. 4 is a view showing the whole of the said apparatus. Figs. 5 and 6 illustrate details and Fig. 7 shows the sub-division of the field of vision through the apparatus.

Referring to Fig. 1, $h$ represents the height of the aerial vessel from the ground. If $v$ is the velocity or speed of the said vessel, $s$ the path traversed in the time $t$, and $\alpha$ the angle from which the path $s$ is viewed from the said vessel, then $$s = v.t$$
$$\therefore s = h.\tan.\alpha$$

Consequently $$v = \frac{s}{t} = \tan.\alpha \frac{h}{t}$$

If the angle $$\alpha = 30°, \tan.\alpha = 0.5774$$

and $v$ is therefore equal to $$0.5774 \frac{h}{t}.$$

This is the first equation hereinafter referred to.

Referring to Fig. 2, if $\varepsilon$ is the time occupied by the projectile in falling, $\sigma$ the path traversed during this time by the airship (that is to say by the projectile also) in the horizontal direction with the velocity $v$, $\varphi$ the angle of projection that is to be ascertained, and $g$ the acceleration of the projectile, then $$\tan.\varphi = \frac{\sigma}{h}$$
$$\sigma = v.\varepsilon$$
$$\tan.\varphi = \frac{v.\varepsilon}{h}$$

This is the second equation hereinafter referred to.

If the equivalent of $v$ that has been ascertained in the first equation be inserted in the second we get:—

$$\tan.\varphi = \frac{0.5774 h.\varepsilon}{ht} = 0.5774.\frac{\varepsilon}{t}$$

But:

$$\varepsilon = \sqrt{\frac{2h}{g}}$$

and therefore $$\tan.\varphi = 0.5774.\frac{\sqrt{\frac{2h}{g}}}{t}$$

$$\text{constant.}\frac{\sqrt{h}}{t}$$

This is the third equation hereinafter referred to.

Broadly speaking the improved apparatus consists of a device having the character of a sextant (Fig. 3). Opposite a telescope 1 is fixed a mirror 2 which is only partially silvered so that, in the known manner, a part I of the rays of light passes right through it, while another portion is reflected onto a mirror arrangement. This arrangement consists of two mirrors 3 and 4 arranged relatively to each other in such a manner that they appear side by side in the field of vision through the telescope. The mirror 3 is similar to the mirror 2 and is fixed in such a manner that the rays II reflected by it are at an angle of 30° to the rays I. The mirror 4 is angularly displaceable and is adjusted by means of a clock movement so that the rays III reflected by it make the angle $\varphi$ with the rays I. The third equation gives the basis for the operation of the adjusting mechanism. As the term $t$ occurring in the said equation represents the time in which a sighted object on the earth's surface passes through the angle of 30°, the clock movement forming part of the adjusting device must operate for the period in which the object upon the earth's surface appears first in the ray II and then in the ray I.

Fig. 5 shows the adjusting mechanism. It consists of a carrier 5 which is displaceable laterally by means of a screw 6, and which carries the clock movement 7 which is started and stopped by means of a pin 8. The clock movement drives a screw threaded spindle 9 mounted in the carrier 5. The arrangement may be such that the pin 8 couples and uncouples a constantly moving part of the clock movement to and from the screw threaded spindle 9, instead of starting and stopping the clock movement. A collar or nut 10 coöperates with this spindle, this nut being if desired mounted in a guide which is not shown, and being so arranged that it can be returned to its normal position by rotation of the spindle.

An arm 12 is mounted upon a fixed pivot 11 on the casing of the apparatus, this arm having a slot 13 in which a pin 14 arranged upon the nut 10 engages. If the distance between the pivot 11 and the axis of the spindle 9 be made equal to $$\text{constant} \times \sqrt{h}$$

of the third equation, which can be effected for each height $h$ by the lateral displacement of the carrier 5, and if the spindle 9 be then allowed to rotate for a period of time $t$ so that the nut 10 is displaced to an extent proportionate to $t$, the angle made by the arm 12 with the axis of the spindle 9 is equal to $\varphi$ in accordance with the third equation and as shown in Fig. 6.

At its pivoting point 11 the arm 12 carries a gear wheel 15 which meshes with a gear wheel 16 having twice the number of teeth as that of the wheel 15. The movable mirror 4 is connected with the spindle of this latter gear wheel. The mirror 4 is arranged in such a manner that in the position of the arm 12 illustrated it is perpendicular to the axis of the spindle 9 and allows the ray III to issue at right angles to the axis of the telescope. This is so because $$t = o, \tan. \varphi = \infty \text{ and } \varphi = R.$$

where R is a right angle. If the arm 12 is displaced in such a manner that it makes the angle $\varphi$ with the axis of the spindle 9, the wheel 15 is rotated through $90° - \varphi$ and the mirror through $\frac{1}{2}(90° - \varphi)$. The ray III is deflected through twice this angle, that is to say through $90° - \varphi$ and then makes the angle $\varphi$ with the axis of the telescope.

As already stated, the mirror 4 occupies such a position when the instrument is set at zero that it allows the ray III to issue perpendicularly to the axis of the telescope that is to say parallel to the surface of the ground, while by the rotation of the screw 9 it is deflected in such a manner that the ray meets the surface of the ground at an angle which increases when $t$ increases. These positions are based upon the following consideration:—If the aerial vessel should be traveling at a very high speed, the time in which a stretch of the earth's surface visible at an angle of 30° is traversed, would be very small. Accordingly, $t$ would be very small and the mirror would then be displaced from its zero position by a very small amount. With such a high speed of the aerial vessel, however, the projectile, which continues to travel with the same horizontal velocity component would have to be discharged a long way in front of the target, (i. e. before the vessel is vertically above the target) so that the target must be sighted at the maximum angle that is to say the angle of projection is at its maximum. From this it follows that in the zero position in which $t$ is zero the ray III must make the maximum angle with the surface of the ground, that is to say must run parallel with it. This is in agreement with the third equation in which $$t = o, \tan. \varphi = \infty \text{ and } \varphi = R.$$

In the second extreme case, that is to say, when the airship is stationary so that the projectile has no horizontal displacement component it would have to be discharged vertically above the target, and accordingly the ray III would have to be perpendicular to the surface of the earth. In this case the time $t$ for traversing a stretch of the earth's surface appearing at an angle of 30° would be infinite and the screw threaded spindle 9 would displace the arm 12 through a right angle (assuming that both the spindle and arm were of infinite length). By the oscillation of the arm 12 the mirror 4 would be displaced to the extent of half R and the ray III to the extent of R from the zero position, that is to say, for the infinite magnitude $t$ the ray III would assume the perpendicular position to the earth's surface. It will, of course, be understood that neither of these extreme cases is possible in practice and that only the intermediate cases have to be considered.

Fig. 4 illustrates the telescope in combination with the adjusting mechanism arranged in a casing 17 which is shown in section. The adjusting screw 6 and the pin 8 protrude from this casing. The scale in accordance with which the carrier 5 is adjusted is fixed to the casing. This scale is not shown on the drawing.

In order to obtain the maximum field of vision it is preferable to employ a non-magnifying telescope. In use the telescope must always be held vertically and consequently a level 18 is arranged upon it, whose image is projected by prisms and lenses into the field of vision in the known manner. Fig. 7 represents the field of vision. Its several zones are indicated I, II, III, to correspond with the designation of the rays in Fig. 3, and by IV in which the level 18 is visible. The zone I permits of vertical vision and serves for the vertical sighting when the field of vision of the telescope is less than 30°.

The apparatus is mounted opposite to or in an opening in the bottom of the body or car of the aerial vessel. In the first place the height attained in the flight is read on the barometer and the carrier 5 is accordingly adjusted on the aforesaid scale by means of the screw 6. Throughout the entire duration of the measurement the instrument is maintained exactly vertical in accordance with the level visible in the zone IV. At the moment at which any convenient and plainly visible object on the earth's surface in the zone II, passes through cross threads when the telescope is held vertical, the clock movement is started or coupled with the spindle by means of the pin 8. At the moment at which the same object passes through the cross threads in the zone I, or with a field of vision of adequate magnitude in the zone II also, the clock movement is stopped by means of the pin 8. The mirror 4 has then been automatically adjusted and the apparatus can immediately afterward be employed for sighting the target, the projectile being discharged as soon as the target is opposite the cross threads or the like in the zone III.

By means of the improved apparatus the time elapsing between the measurement of the angle $\varphi$ and the discharge of the projectile is practically reduced to the minimum which largely increases the certainty of aim as, in actual practice, the measured angle is applicable to approximately the time of measurement only, owing to variations in the speed and height of the aerial vessel which of necessity take place repeatedly.

Having thus described my invention, what I claim as new, and desire to secure by Letters Patent, is:—

1. In apparatus for determining the angle of projection for projectiles discharged from an aerial vessel, adjustable means for sighting the target, means for viewing a portion of the earth's surface through a definite angle of vision, and means for automatically adjusting said sighting means, during the time taken by the apparent movement of a fixed object through the said angle of vision so that the said sighting means are then set at the correct angle to the line of projection of the projectile.

2. In apparatus for determining the angle of projection for projectiles discharged from an aerial vessel, adjustable means for sighting the target, two fixed mirrors of which one is only partially silvered, so arranged that a portion of the earth's surface may be viewed through a definite angle of vision and means for automatically adjusting said sighting means during the time taken by the apparent movement of a fixed object through the said angle of vision so that the said sighting means are then set at the correct angle to the line of projection of the projectile.

3. In apparatus for determining the angle of projection for projectiles discharged from an aerial vessel, a fixed mirror, an adjustable mirror, and means for automatically adjusting the last mentioned mirror during the time taken by the apparent movement of a fixed object through a definite angle of vision so that the said adjustable mirror is then set at the correct angle to the line of projection of the projectile.

4. In apparatus for determining the angle of projection for projectiles discharged from an aerial vessel, two fixed mirrors of which one is only partially silvered, so arranged that a portion of the earth's surface can be seen through a definite angle of vision, an adjustable mirror, and means for automatically adjusting the last mentioned mirror during the time taken by the apparent movement of a fixed object through the said angle of vision so that the said adjustable mirror is then set at the correct angle to the line of projection of the projectile.

5. In apparatus for determining the angle of projection for projectiles discharged from an aerial vessel, two fixed mirrors of which one is only partially silvered so arranged that a portion of the earth's surface can be seen through an angle of vision of thirty degrees, an adjustable mirror, and means for automatically adjusting the last mentioned mirror during the time taken by the apparent movement of a fixed object through the said angle of vision so that the said adjustable mirror is then set at the correct angle to the line of projection of the projectile.

6. In apparatus for determining the angle of projection for projectiles discharged from an aerial vessel, adjustable sighting means for the target, means for viewing a portion of the earth's surface through a definite angle of vision, means for automatically adjusting said sighting means during the time taken by the apparent movement of a fixed object through the said angle of vision so that the said sighting means are then set at the correct angle to the line of projection of the projectile, means for bringing said automatic adjusting means into operation when an object enters the angle of vision and for throwing it out of operation as the object leaves the angle of vision.

7. In apparatus for determining the angle of projection for projectiles discharged from an aerial vessel, two fixed mirrors of which one is only partially silvered so arranged that a portion of the earth's surface can be seen through a definite angle of vision, an adjustable mirror, a pivoted member, means for connecting said member with the said adjustable mirror, means for oscillating said member and means for varying the distance between the last mentioned means and the pivotal point of said member.

8. In apparatus for determining the angle of projection for projectiles discharged from an aerial vessel, two fixed mirrors of which one is only partially silvered so arranged that a portion of the earth's surface can be seen through a definite angle of vision, an adjustable mirror, a pivoted member, gear wheels in the ratio of one to two connecting said mirror to the said member, a screw-threaded spindle, means for rotating said spindle, a nut on said spindle, means on said nut for engaging with the pivoted member, a carrier in which the screw-threaded spindle is mounted and means for effecting movement of said carrier toward and away from the pivotal point of the said member.

In testimony whereof I affix my signature in presence of two witnesses.

HANS BOYKOW.

Witnesses:
FERDINAND ROHWIOWA,
ADOLF FLAMMEL.